United States Patent

McCorry

[11] Patent Number: 5,843,492
[45] Date of Patent: Dec. 1, 1998

[54] APPARATUS FOR MULTIPLE SHEET LINE MOLDING

[75] Inventor: Richard P. McCorry, Farmington Hills, Mich.

[73] Assignee: Lear Corporation, Southfield, Mich.

[21] Appl. No.: 661,625

[22] Filed: Jun. 11, 1996

[51] Int. Cl.$^6$ .................................................. B29C 51/04
[52] U.S. Cl. ..................... 425/397; 264/291; 264/322; 425/394; 425/400; 425/DIG. 48; 425/DIG. 53
[58] Field of Search .................................... 425/394, 397, 425/400, 403, 403.1, DIG. 48, DIG. 53; 264/322, 320, 291

[56] References Cited

U.S. PATENT DOCUMENTS

| | | | |
|---|---|---|---|
| 2,759,217 | 8/1956 | Peterson | 425/DIG. 53 |
| 2,918,696 | 12/1959 | Bottoms et al. | 425/DIG. 53 |
| 2,968,064 | 1/1961 | Howell | 425/388 |
| 3,025,566 | 3/1962 | Kostur | 425/DIG. 48 |
| 3,078,516 | 2/1963 | Trammell, Jr. et al. | 425/DIG. 48 |
| 3,115,678 | 12/1963 | Keen et al. | 425/343 |
| 3,172,927 | 3/1965 | Mojonnier . | |
| 3,315,301 | 4/1967 | Dibblee et al. | 425/394 |
| 3,632,268 | 1/1972 | Pomernacki | 425/348 R |
| 3,910,747 | 10/1975 | Dean et al. | 425/397 |
| 3,914,103 | 10/1975 | Dean et al. | 425/397 |
| 4,097,035 | 6/1978 | Shuman | 425/388 |
| 4,170,449 | 10/1979 | Shuman | 425/445 |
| 4,185,069 | 1/1980 | Smith et al. | 264/322 |
| 4,447,200 | 5/1984 | Weisner et al. | 425/388 |
| 4,592,717 | 6/1986 | Albert | 425/400 |
| 4,744,848 | 5/1988 | Andrews et al. | 156/224 |
| 4,847,034 | 7/1989 | Araki et al. | 264/550 |
| 4,938,678 | 7/1990 | Oulman | 425/397 |
| 4,944,668 | 7/1990 | Asano et al. | 425/397 |
| 5,207,963 | 5/1993 | Grace | 264/163 |
| 5,468,138 | 11/1995 | Bosse et al. | 425/DIG. 53 |

OTHER PUBLICATIONS

European Patent Office Patent Abstracts of Japan, Publication No. 59118424, 09–07–84 (Akio) for Forming Method Of Surfacing Material For Vehicle.

*Primary Examiner*—Patrick Ryan
*Assistant Examiner*—Joseph Leyson
*Attorney, Agent, or Firm*—Synnestvedt & Lechner

[57] ABSTRACT

Apparatus for compression molding thermoplastic backed carpeting in deep draft molds wherein carpeting is precut into sheets, heated, positioned between the mold parts, clamped at selected locations around its periphery, differentially prestretched by tensioning actuators, compression molded, cooled and removed from the mold. Tensioning actuators draw the sheet material downwardly into the deep draft of the mold and further stretch the material in the region of shallow draft, uniformly thinning the material. Stretching of the material by the mold during the compression molding step is minimized in this method. Prestretching allows sheets to be precut to a smaller size than the mold for more efficient use of material and provides control of product thickness independent of mold draft.

14 Claims, 8 Drawing Sheets

APPARATUS FOR MULTIPLE SHEET LINE MOLDING

FIELD OF THE INVENTION

This invention relates to a method and apparatus applicable to both thermoforming and compression molding of sheet material wherein the sheet material is differentially and selectively prestretched prior to the molding step. In compression molding the molding step occurs when mating mold parts engage. In thermoforming, the molding step occurs when the applied vacuum draws the sheet against the mold surface. The invention is especially applicable, although not limited to deep draft molds typically used in the manufacture of molded carpet having a thermoplastic sheet underlay for automobile interiors.

Although not limited thereto, the compression molding process is the preferred method for this particular application.

BACKGROUND OF THE INVENTION

With traditional methods of compression molding sheet material, precut thermoplastic sheet stock is heated above its glass transition temperature but below its melting point. The heated sheet is placed between the mating parts of a compression mold, the mold parts being disengaged in an open position. The sheet is tentered by clamps or pins which grip or are otherwise attached to the periphery of the sheet. The mating parts of the compression mold typically have deep drawn contours which match a complicated shape, such as that of the floor of an automobile interior for example. Following tentering of the heated sheet, the mold is closed, the mold parts engaging under pressure, the mold forcing the sheet to stretch and conform to the mold shape. The sheet material cools below its glass transition temperature within the mold, either naturally or via an active cooling system, and the sheet permanently assumes the molded shape. The mold parts are disengaged and the molded product is removed for further processing such as trimming. The molded product may then be installed in its intended product, where its molded shape conforms to and provides a protective covering for a complex shape, such as the floor in the passenger compartment of an automobile.

In the traditional method of sheet compression molding only the mold itself causes the sheet material to stretch. Material stretch is a function of the rheology of the material and the draft of the mold. In the mold, the deeper the draft at a given point, the more the material will be stretched at that point. Deeper draft regions have more surface area than flatter regions on the mold, thus, when a flat sheet is distorted by the molding action and forced to conform to the mold contours, the deeper draft regions require proportionally more stretching of the sheet to cover the greater surface area. Greater stretching of the sheet in deep draft regions means the sheet will be proportionally thinner, perhaps unacceptably thinner, in those regions as compared with the shallower draft areas with less surface area requiring less material stretching. Traditionally, unacceptable thinning is avoided to a degree by draping material into the deep draft regions to provide sufficient material for the increased area coverage. This is a wasteful process however which requires more material and can lead to poor product quality and an increased rejection rate as permanent wrinkles can be introduced into the product in these deep draft regions during mold engagement.

Stretching of the material only by the mold places limits on the shape a mold may have, given material rheological properties such as the strain failure point. Although typical sheet materials used in the compression molding process have high strain to failure properties, typically on the order of 20%–30%, deep draft areas of a mold create weak points and can even cause material failures due to excessive concentrated localized stretching. The defect may take the form of unacceptably thin material in the deep draft region, or there may be a tearing when the material cannot stretch sufficiently to cover the greater surface area of the deep draft region. Thus, some mold designs in which the draft is too deep are proscribed by the traditional molding method.

In addition to limits on mold shape, the traditional methods of sheet compression molding are wasteful of material. Only the mold stretches the sheet during the molding step. Because the sheet stretches are proportional to the mold draft, the sheet must be cut into a blank size which is dictated by the mold draft, size and shape. This results in sheet blanks cut larger than the mold and typically entails significant waste as material remaining outside of the mold when the mold is closed must be trimmed and discarded. Even if the material is recycled, the manufacturing process is still adversely affected because recycling requires expenditure of resources which could be put to better use elsewhere.

Product quality is also adversely affected by the traditional method of compression molding. Because the mold stretches the material, there is no direct control over the uniformity of the product thickness. Sheet stretching proportional to mold draft dictates that deep draft areas of the product will be thinner and shallow draft areas will be thicker. Given the typical applications of the compression molding process, the molds can be expected to have significantly varying drafts. Thus, any practical product will have significant differences in thickness throughout the product. Such thickness variations are undesirable because they indicate inefficient use of raw material, as some areas of the product are thicker than they need to be in order that other areas of the product have sufficient thickness to perform their intended function. Thickness variation can also cause the product to wear out quicker in one location than another, or be more flexible, or less flexible as compared with other locations on the same product. The lack of control of the material properties of the finished product by the traditional method of sheet compression molding can lead to poor or unacceptable product quality as well as excessive material waste and higher production costs or lower profit.

There have been some attempts to address the problems associated with the traditional compression molding methods as outlined above. For example, U.S. Pat. No. 5,207,963 to Grace discloses a method of molding a plastic backed carpet blank using yieldable holding clamps maintaining the carpet sheet under constant tension during the molding process. The '963 patent provides a means by which constant tension can be applied to different parts of the sheet in response to the draw of the mold on the sheet. The '963 patent is mainly concerned with avoiding permanent wrinkles caused in the deep draft regions of a mold and does not address the underlying problem of the traditional method wherein the material stretch is caused primarily by the mold geometry. The '963 patent provides a passive means to supply sheet tension in proportion to mold draft, but the mold still controls sheet stretching, the clamping tension provided in reaction to sheet tensioning by the mold draw during mold engagement.

U.S. Pat. No. 4,944,668 to Asano et al, uses gripping devices to pull heat softened plastic sheet just prior to compression mold engagement. The object of the '668 patent is to support the edges of the plastic sheet and prevent them from sagging into a concave shape while shrinking due to uneven cooling. The system disclosed is intended to prevent molding problems resulting from uncontrolled and unsupported free edge distortion in the compression molding process and does not teach differential prestretching as a function of mold draft or shape. Stretching in the '668 patent ensures that the sheet is flat and square and not deformed prior to mold engagement.

U.S. Pat. No. 4,744,848 to Andrews et al uses a hinged clamping frame which holds the sheet material for molding in deep draft molds. The hinged frame "floats" on the mold die to assume an optimum position during forming to prevent tearing or stretching of the carpet. Sheet stretching is confined to the non-carpet perimeter region of the sheet blank. The '848 patent does not teach prestretching as a function of mold draft, and differential stretching is effected passively by allowing the sheet to float in the mold via the hinged frame. Uniform sheet stretching in the product is also not taught, rather, highly non-uniform stretching is used by confining the stretching of material to edge regions of the sheet having no carpet laminate.

U.S. Pat. No. 3,315,301 to Dibblee discloses a method and apparatus for uniformly stretching and then forming sheet material. Preheated plastic sheet is uniformly stretched in a frame while continuously clamped along each edge. The '301 patent teaches away from using individual clamps providing pinpoint, selective control of sheet prestretch, nor is the uniformity of thickness controlled in the molded product by selective differential prestretching. Only the thickness of the raw stock prior to molding is directly controlled.

U.S. Pat. No. 3,115,678 to Keen et al uses a segmented mold which progressively engages heated sheet material for compression molding of plastic backed carpets for automotive application. A pressure ring continuously clamps the sheet periphery and allows the sheet to slip into the mold as the mold segments engage their mating counterparts and incrementally stretch the sheet. The '678 patent does not teach selective prestretching of the sheet as a function of mold draft or shape or the use of clamps or actuators to effect differential prestretching. In keeping with traditional methods of compression molding, the sheet is stretched entirely by the mold in the '678 patent, not independently prior to mold engagement.

SUMMARY AND OBJECTS OF THE INVENTION

The invention provides a method and apparatus applicable to thermoforming or compression molding sheet material wherein the draft of the material is controlled independently of the mold draft. The material is moved independently of mold geometry to different forming heights. The invention uses sheet tensioning means to selectively and differentially prestretch and move the sheet material prior to mold engagement. The tensioning means draws the sheet into the deep draft areas of the mold, providing pinpoint, controlled prestretching of the sheet at selected locations by the tensioning means and avoids the uncontrolled stretching of the material by the mold alone which can result in undesired elongation variability. The material is thus predimensioned by stretching according to the shape and draft of the mold prior to the mold closing.

The invention further provides a method and apparatus for directly controlling sheet thickness to avoid elongation variability in either the thermoforming or compression molding processes by selectively and differentially prestretching the sheet material in regions not normally subjected to significant stretching due to mold draft.

The invention also provides a method and apparatus for simultaneously stretching the sheet material in two directions prior to mold engagement to provide for both adequate material draft in the deep draft region of a mold and efficient mold coverage by the sheet material. In a preferred mode of carrying out the invention the sheet stock may often be cut to a size smaller than the mold size.

In one preferred embodiment of the apparatus, clamping means, comprising individual clamps, are mounted on positioning fixtures and positioned at predetermined locations around one of the mold parts. The clamps grip the heated sheet material, draped over the mold, at various predetermined locations about the sheet periphery. The clamps are preferably connected to actuators, which could be pneumatic, hydraulic, electrical, or mechanical in operation.

The actuators preferably provide the tensioning means and selectively and differentially pull on the sheet, stretching the sheet and drawing the sheet into the deep draft regions of the mold. The actuators preferably provide most of the sheet stretching prior to mold engagement. The actuators also preferably stretch the sheet in regions of shallow draft a maximum amount as limited by material rheology, thereby controlling sheet thickness and providing substantial uniformity of thickness throughout the molded product. Raw material is used efficiently as a result of the selective differential stretching of the sheet material by the tensioning means.

Preferably, the actuators are mounted on support means comprising an adjustable frame. The frame is preferably universally applicable to a wide range of mold shapes and sizes. Preferably, the frame can be removably mounted on the mold by mounting means such as mounting beams with flanges which are bolted to the mold. Also preferably, the frame is adjustable in size to accommodate different mold sizes. This is preferably accomplished by constructing the frame from tubular members which telescopically interengage, thus permitting the frame perimeter dimensions to be adjusted over a relatively wide range. Preferably, the tubular frame members have means for locking the interengaging members against relative telescoping motion when the desired frame adjustments have been made.

The actuators are preferably adjustably mounted on the frame allowing the actuators to be conveniently and easily positioned and repositioned as necessary at a wide range of selected locations relatively to the mold. Means are also provided on the frame to adjust the angular orientation of the actuators relatively to the mold. The adjustable mounting permits tensioning forces to be applied to the sheet material at selected locations and at predetermined angles relatively to the mold.

In a second preferred embodiment of the apparatus, a further adjustment means is provided for angular adjustment of the actuators allowing the actuators to pull the sheet material at a compound angle relatively to the mold such that the sheet material is both drawn downwardly into the deep draft regions of the mold and simultaneously drawn laterally to cover the greater surface area of the mold. Again, significant stretching of the sheet material is effected by the actuators and not by the mold.

In a third preferred embodiment of the apparatus, a means for precutting the sheet material to a predetermined size prior to prestretching is provided. The size of the cut sheet material to be relative and inversely proportional to the prestretching of the sheet material.

In a preferred embodiment of the method, the clamping means and tensioning means are prepositioned on a support frame around the mold adjacent the deep draft regions such that the sheet material may be gripped by the clamping means and drawn by the tensioning means into the deep draft regions of the mold. Preferably, clamping means are prepositioned via positioning fixtures adjacent to the regions of shallow mold draft to stretch the sheet material and control the material thickness, for uniformity throughout the molded product. At least one trial molding operation is preferably run by precutting a sample of the sheet material to a shape and size which will fit over one mold part and be gripped by the clamping means, heating the sheet material above its glass transition temperature but below its melting point, draping the sheet over the mold part when the mold is open and the parts are disengaged, gripping the sheet via the clamping means, pulling on the sheet by the sheet tensioning means, thereby stretching the sheet and drawing it into the deep draft regions of the mold, also preferably controlling the stretch in the shallow draft regions of the mold and then engaging the mating mold part, closing the mold and causing the sheet to conform to the mold shape, cooling the sheet, opening the mold and removing the molded product therefrom. The product is then preferably inspected for stretch and thickness and any necessary adjustments are made to the position of the clamping means and actuators to control the differential stretching of the sheet. To aid the adjustment process, a grid of squares, typically 100 mm by 100 mm, are drawn on the sheet prior to the heating step. Sheet stretching may be judged visually by examining and measuring the distortion of the squares throughout the various regions of the product. The squares can be measured to accurately ascertain the degree of stretch at any given region comparing the percentage of stretch to readily available stretch data for the material employed. This information is then used to reposition clamping and tensioning means on the frame in regions wherein the degree of stretch is unacceptable either because it is too great or too small.

When the final positions of the tensioning and clamping means are determined based upon the acceptability of the molded product from the trial runs, the method may be used to mass produce molded products. The method proceeds as outlined above, without the need of drawing a grid on the sheet material or further adjusting the clamping or tensioning means.

It is an object of the invention to provide a method and apparatus for thermoforming or compression molding of sheet material in which the material is drawn independently of the mold draft.

It is another object of this invention to provide a method and apparatus in which the significant differential stretching of the sheet material is performed prior to mold engagement in the compression molding process and prior to vacuum draw in the thermoforming process.

It is still another object of this invention to provide a method and apparatus in which the draft of sheet material can be controlled independent of the mold draft in the compression molding and thermoforming processes.

It is yet another object of the invention to provide a method and apparatus for controlling the thickness of products and achieve reasonably uniform thickness throughout the product formed by the compression molding process.

It is another object of the invention to provide a method and apparatus for more efficiently using raw material in the compression molding and thermoforming processes.

It is yet another object of the invention to reduce set-up time for production of compression molded products by providing tooling such as an adjustable frame adaptable to a wide range of mold shapes and sizes.

It is yet a further object of the invention to reduce costs associated with production of compression molded products by providing tooling such as an adjustable frame which can be reused with different compression molds.

These and other objects will become apparent from a consideration of the following drawings and detailed description of preferred embodiments of the invention.

DETAILED DESCRIPTION OF PREFERRED EMBODIMENTS

Figure 1:
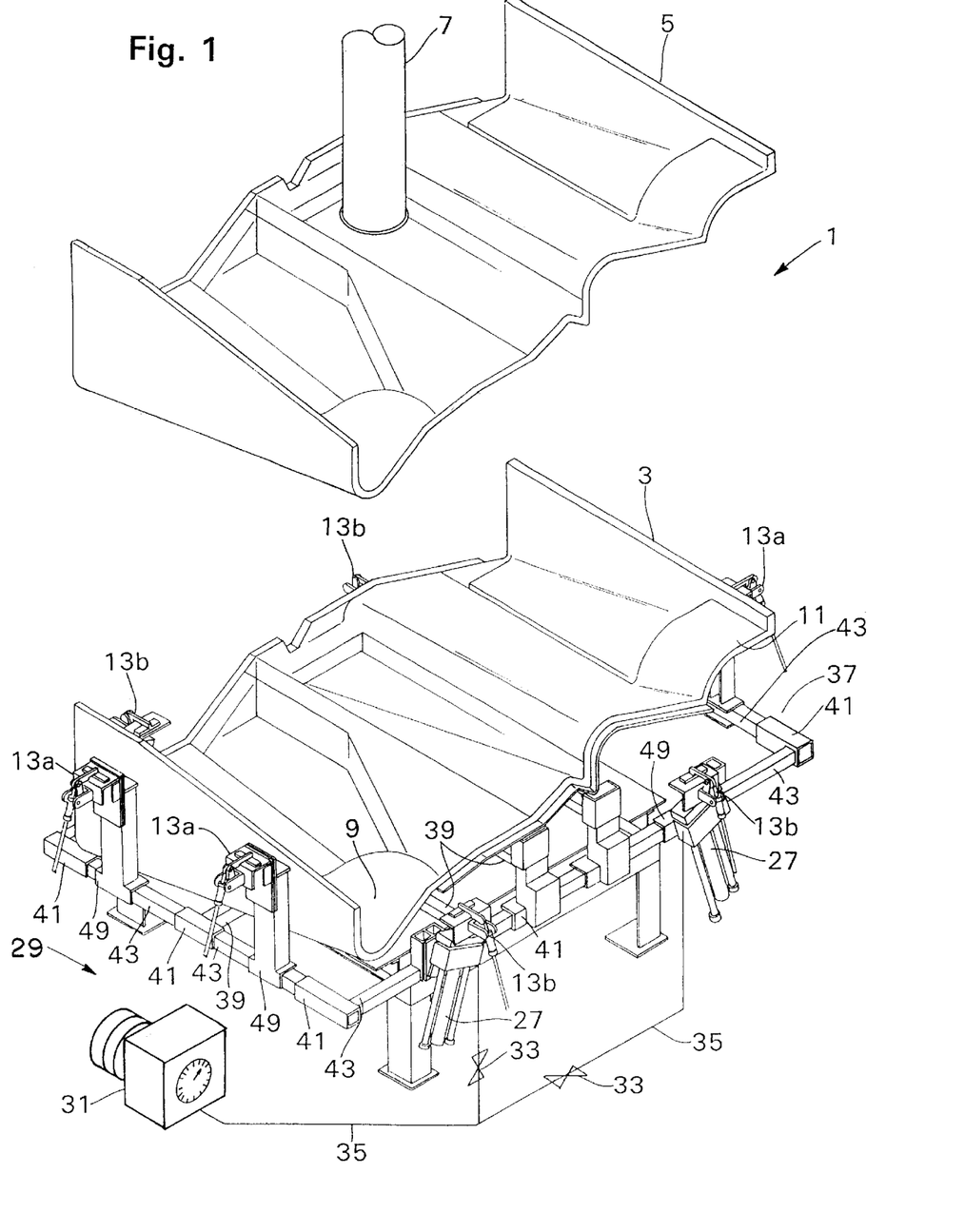
FIG. 1 shows an isometric view of a preferred embodiment of the apparatus according to the invention.

FIG. 1 shows compression mold 1 comprising interengagable mold parts 3 and 5. A ram or press 7 effects vertical motion of mold part 5 by which the mold parts may be brought into an open, disengaged position, as seen in FIG. 1, or a closed, interengaged position, part 5 mating with part 3. Mold 1 has at least one region of greater draft, such as shown at 9 and at least one region of lesser draft, such as shown at 11. Regions of greater draft have more surface area than regions of lesser draft and sheet material being molded typically must be stretched further to adequately conform to regions of greater draft. This increased stretching can result in material thinning disproportionately in a deep draft region when compared with other regions of the sheet which stretch less when conforming to regions of lesser draft having smaller surface areas. In order to better control the stretching of the sheet material and prevent unacceptably thin regions from forming, the method according to the invention prestretches the material selectively, drawing an adequate amount of material downwardly into the deep draft region of the mold ensuring adequate coverage of the increased surface area by material of adequate thickness. This method is unlike the traditional method of sheet molding wherein the mold itself draws and stretches the material when the sheet conforms to the mold. The method of sheet molding according to the invention therefore requires means for selectively gripping the sheet and applying tension forces to prestretch the sheet into the mold. The gripping and tensioning means must be supported adjacent to the mold at the selected locations, and this support is provided by an adjustable frame 37 surrounding the mold 1, as shown in FIG. 1.

An adjustable support frame can be used on a wide range of mold shapes and sizes. Thus, custom support frames need not be specially designed and made for each particular mold design, saving design and manufacturing costs. The frame 37 as shown is rectangular, although other shapes may sometimes be employed.

Figures 3, 3A:
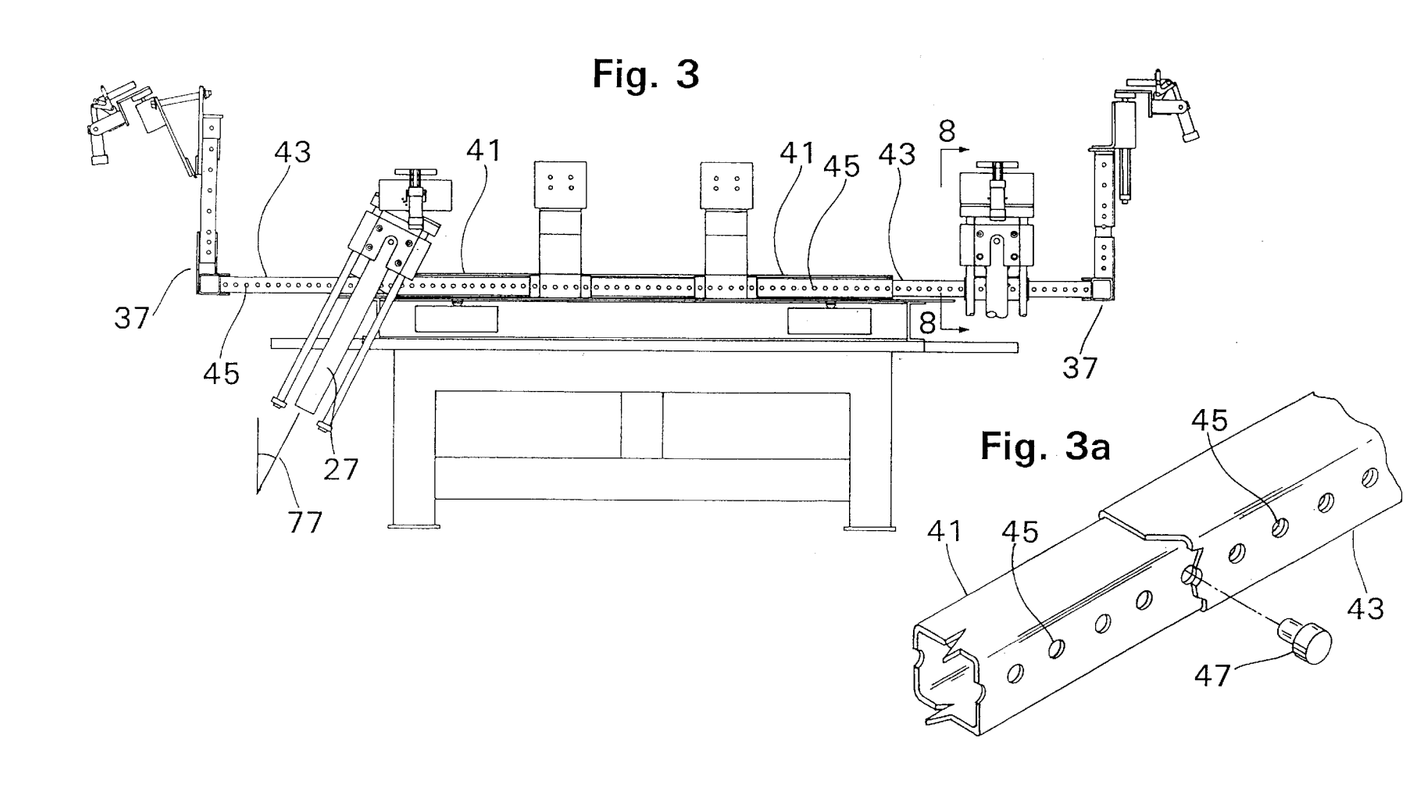
FIG. 3 shows an elevational view of a preferred embodiment of the support frame, tensioning means and clamping means.
FIG. 3a shows a detailed view of the preferred elongated members and their associated adjustment means.

The adjustability of the frame is effected by the elongated support members of frame 37, shown in FIGS. 1, 3 and 3a, being preferably comprised of tubular fittings 41 and tubular beams 43. Beams 43 telescopically interfit coaxially within fittings 41, which in turn are supported by struts 39 extending from the base of mold part 3. Beams 43 can be readily moved into and out of fittings 41 to interconnect the fittings forming a continuous frame 37 of any desired size. The frame size adjustment is further achieved by means for locking beams 43 coaxially within the fittings 41. FIG. 3 best illustrates a preferred and conveniently implemented locking means, which comprises a plurality of equidistantly spaced apertures 45 arranged lengthwise along both beams 43 and fittings 41. Coaxial locking of beam and fitting is effected by moving the beam relatively to the fitting bringing the respective apertures into registration, at which point pin member 47 may be inserted, engaging apertures 45 in both beam and fitting, thereby coaxially locking the two frame members, as shown in FIG. 3a.

The telescopic interfitting of the frame members thus allows the frame size to be conveniently adjusted by sliding the beams within the fittings to adapt the frame to different size molds. The frame may also be conveniently modified while on a particular mold by the same adjustment feature.

It is preferable to mount frame 37 onto mold part 3 by bolting the fittings 41 to the struts 39 and further bolting struts 39 to mold part 3. The bolted connection permits easy assembly and removal of the frame to and from the mold part 3. The fact that the frame is removably mounted to the mold and adjustable in size provides the advantage that the frame 37 can be reused with subsequent molds of different sizes, thus saving the tooling costs on subsequent molds. The support frame need not be scrapped with a mold rendered obsolete as new molds are created to match new product requirements.

In addition, because the frame is not an integral part of the mold, the mold can be designed and manufactured independently of the frame, resulting in less cost and reduced procurement time for the mold.

Figure 4:
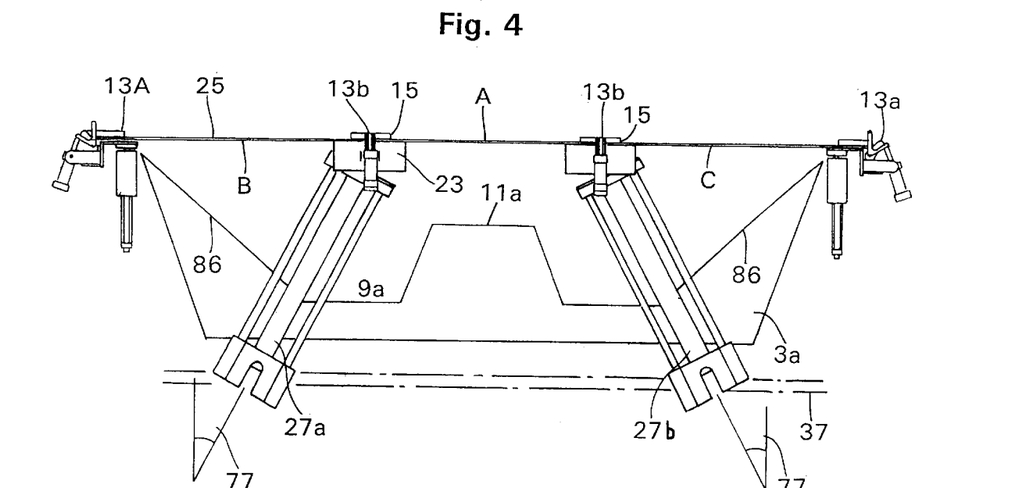
FIG. 4 shows an elevational view of a preferred embodiment of the apparatus with a piece of sheet material positioned on the mold.
Figure 5:
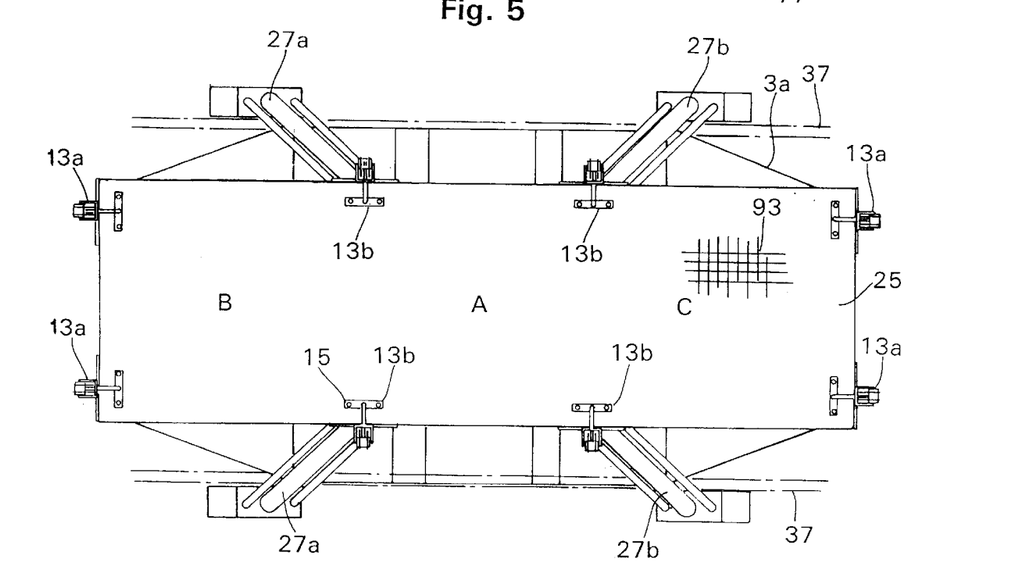
FIG. 5 shows a plan view of FIG. 4.
Figure 6:
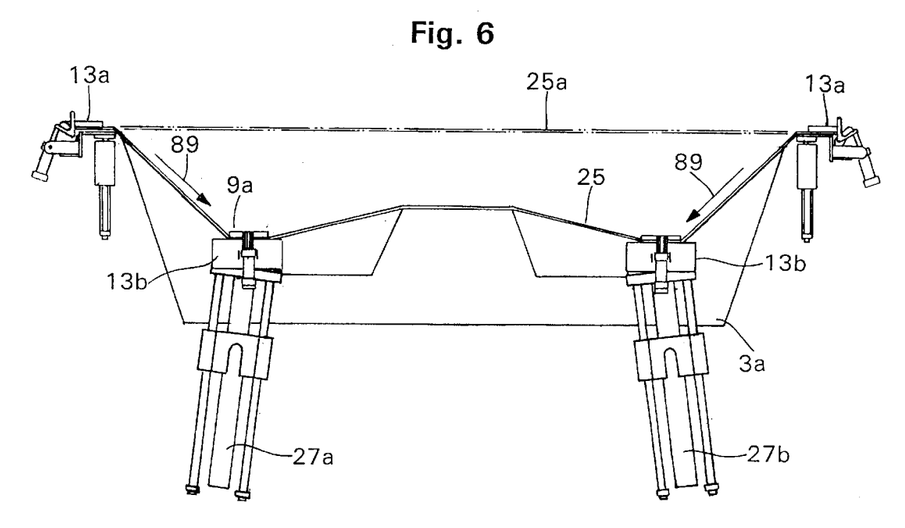
FIG. 6 shows an elevational view of the actuators pre-stretching the sheet material in a preferred embodiment of the invention.
Figure 7:
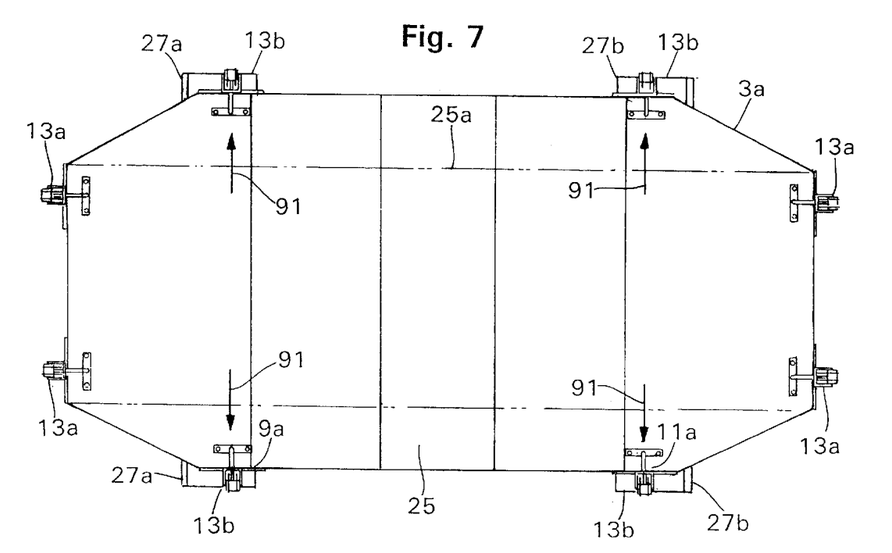
FIG. 7 shows a plan view of FIG. 6.

The purpose of the frame is to position and support the clamping and tensioning means at a plurality of selected locations around the mold 1 in order that the sheet material may be effectively gripped and prestretched in the molding process according to the invention. Clamps 13a and 13b, shown in FIGS. 1, 4 and 5, provide the means by which sheet material 25 is gripped or held between mold parts 3 and 5. A typical clamp is shown in detail in FIG. 8. Both clamps 13a and 13b preferably have a jaw 15 which pivots about pivot point 17 when driven by actuator 19 through linkage 21. When jaw 15 is closed downwardly on to anvil 23 sheet 25 is gripped between jaw 15 and anvil 23. Preferably there are a plurality of clamps 13a and 13b along each side edge, as seen in FIG. 1.

Clamps 13b are preferably operatively attached to the sheet tensioning means to effect selective prestretching of sheet material gripped by the clamps. The sheet tensioning means is preferably comprised of a plurality of actuators 27, 27a and 27b as seen in FIGS. 1 and 4–7. Actuators 27 can be individually powered by hydraulic, pneumatic, electrical, mechanical, or other convenient means. Regulating means shown at 29 in FIG. 1, regulates the tensioning force and may comprise a compressor 31 with valves 33 in control lines 35, to regulate sheet material stretching at predetermined locations on the sheet and thereby provide differential stretching by powering actuators 27 with different force magnitudes and different stroke lengths.

Selective prestretching of the sheet material 25 is effected by actuators 27 starting from the position of FIGS. 4 and 5, in which actuators 27 are extended upwardly and angularly allowing clamps 13b to grip sheet 25 positioned over mold part 3a. The sheet is also gripped by clamps 13a which serve to further support sheet 25. The actuators then retract, pulling clamps 13b downwardly and differentially stretching sheet 25 into the position shown in FIGS. 6 and 7. The unstretched shape of sheet 25 is shown in phantom at 25a in FIGS. 6 and 7.

Figure 8:
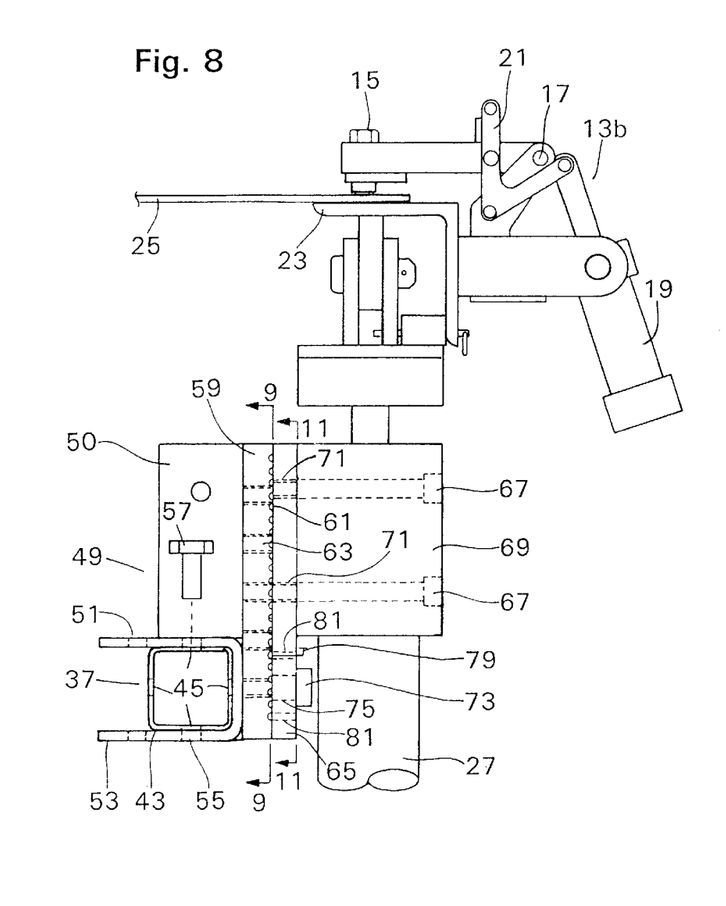
FIG. 8 shows a detailed view of a preferred embodiment of the clamping means, tensioning means, positioning fixture and means for positionally adjusting the positioning fixture, means for vertically adjusting the tensioning and clamping means and means for angularly adjusting the tensioning and clamping means according to the invention.
Figure 8A:
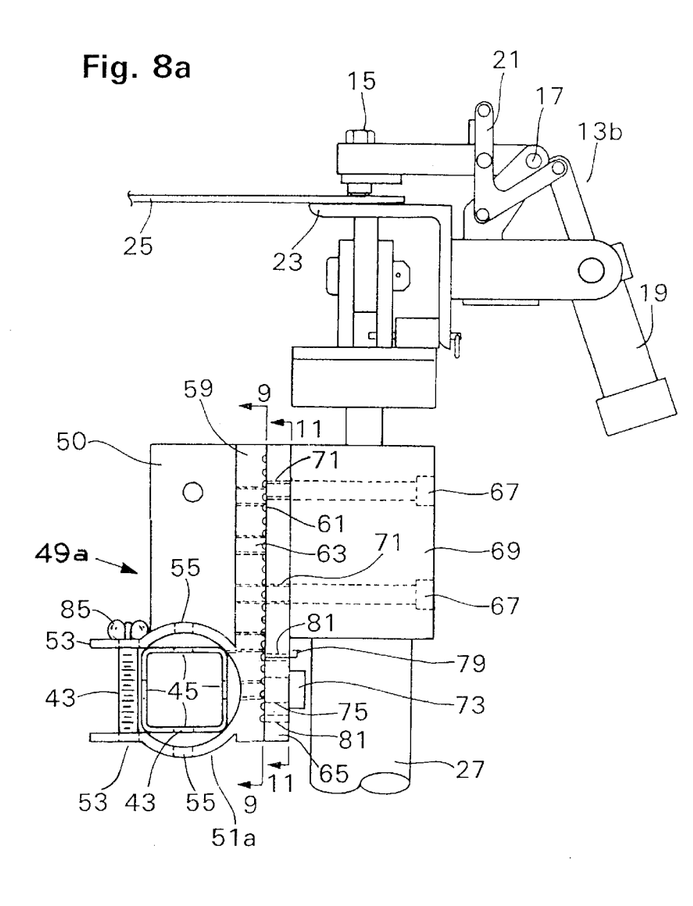
FIG. 8a shows a preferred embodiment of a second means for angularly adjusting the tensioning and clamping means according to the invention.
Figure 8B:
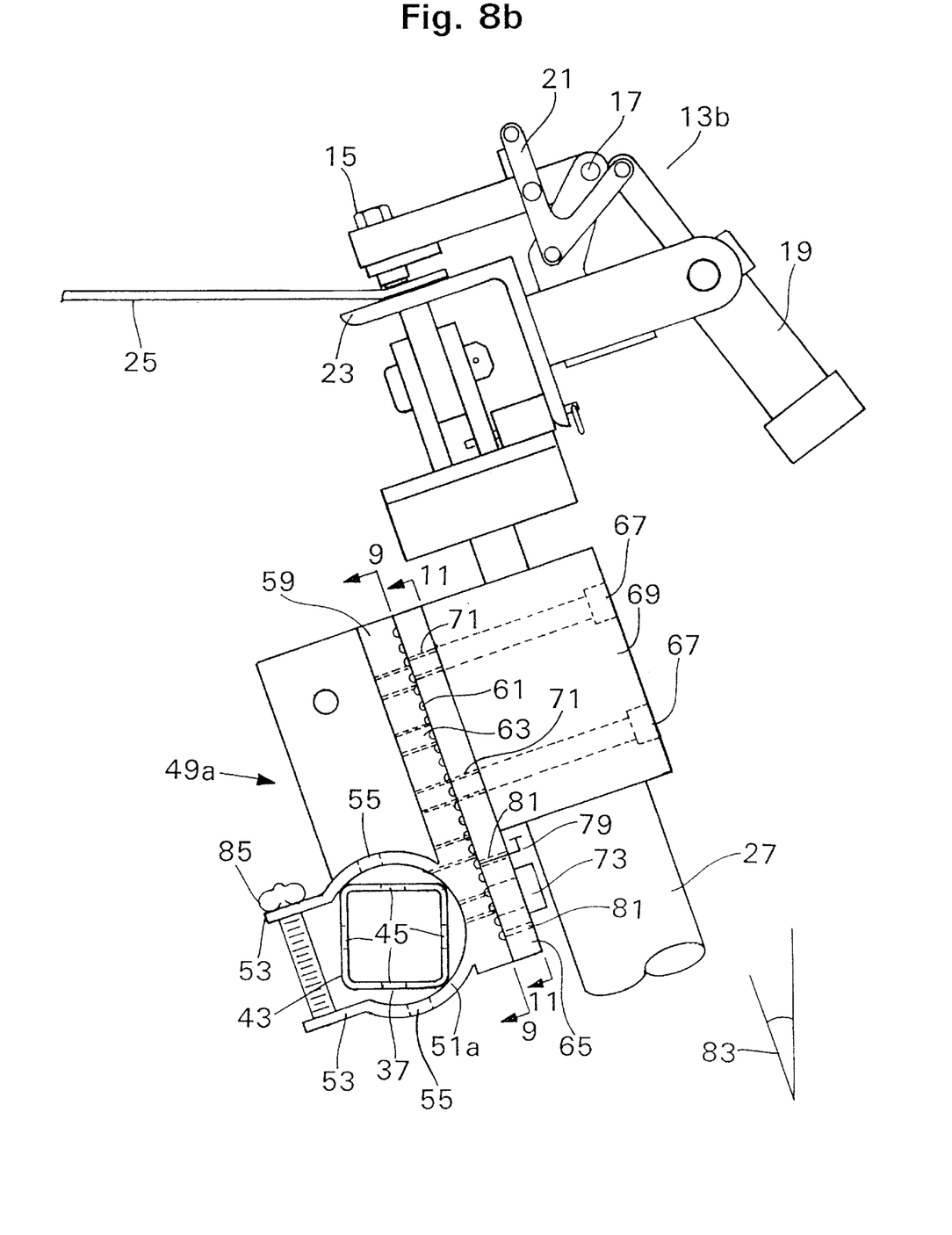
FIG. 8b shows the tensioning and clamping means angularly adjusted via the second adjustment means.
Figures 9, 10:
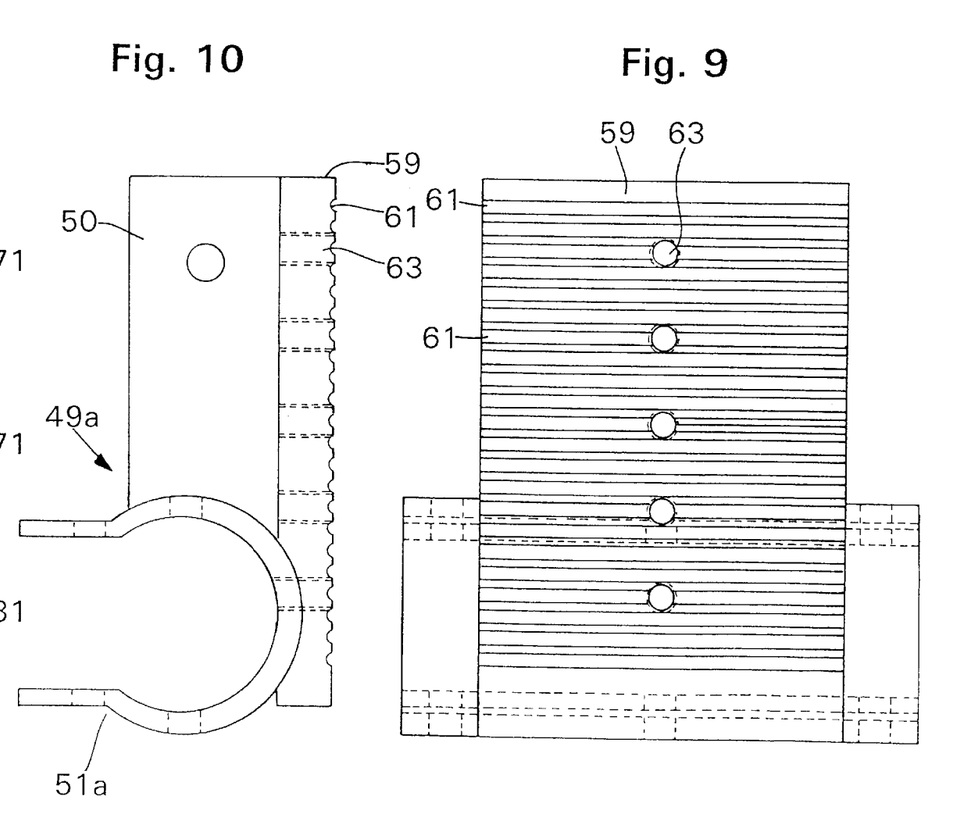
FIG. 9 shows a front view of a preferred embodiment of a positioning fixture having positional, vertical and angular adjustment means.
FIG. 10 shows a side view of FIG. 9.

Preferably, clamps 13a and 13b as well as actuators 27 are adjustably mounted at any one of a plurality of positions around mold 1 on support frame 37 by means of a plurality of positioning or upright holding fixtures 49 and 49a, shown in FIGS. 1, 8, 8a, 9 and 10. Adjustable positioning fixtures 49 and 49a, being located at a plurality of positions on frame 37 include clamps 13a and 13b mounted thereon, and allow the clamps to grip the sheet material 25 at any one of a plurality of positions around its periphery in order to effect the selective differential prestretching of the sheet by actuator 27. Positioning fixtures 49 and 49a are comprised of a channel section 51 or 51a respectively, column members 50 and plate 59, as shown clearly in FIGS. 8 and 10. The positioning fixtures are slidably supported on either beams 43 or fittings 41 via elongated channel sections 51 or 51a allowing the fixtures to be conveniently positioned at any desired location on frame 37. The slidable mounting is achieved by sizing Channel sections 51 and 51a to interengage either type of frame member, beam 43 or fitting 41, as shown in FIGS. 8, 8a and 8b . Once positioned at a desired location, the fixtures may be locked into place on the frame 37, thereby locking associated actuator 27 and clamp 13b mounted on the positioning fixture into one of a plurality of locations on the frame 37.

The locking means of the positioning fixtures 49 or 49a is effected by channel sections 51 or 51a having spaced flanges 53 which preferably have at least two apertures 55 spaced lengthwise along the flanges. Apertures 55 may be brought into registry with apertures 45 in beams 43, as seen in FIG. 8, or fittings 41 (not shown) at any of a plurality of points along the beams 43 or fittings 41 by sliding positioning fixture 49 to the desired location. Locking pin 57, seen in FIG. 8, may then be mated with aligned holes 55 and 45 to prevent sliding motion of the positioning fixture 49, locking it into one of a plurality of preselected positions on beams 43 or fittings 41 relatively to mold 1.

In addition to providing positional adjustability to actuators 27 and clamps 13b on frame 37, positioning fixtures 49 and 49a also provide vertical adjustment means for the actuators and clamps. The vertical adjustment means allows discrete changes to be made in the range of vertical travel of actuators 27, allowing the clamps 13b to grip sheet material 25 placed at a greater height above mold part 3, or to draw sheet material 25 deeper into the mold.

Figure 11:
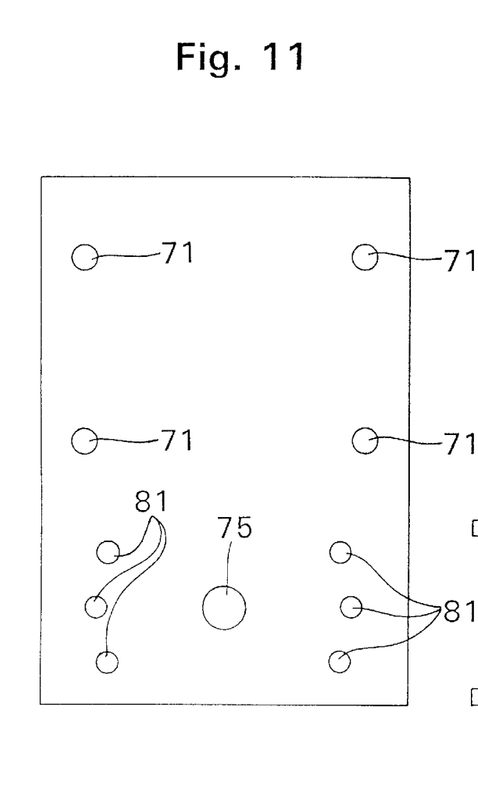
FIG. 11 shows a front view of a preferred embodiment of a plate mounting on a positional fixture and mounting tensioning and clamping means.

The vertical adjustment means is preferably the same for both positioning fixtures 49 and 49a and will therefore only be described in terms of fixture 49. As noted above, plate 59 is secured to positioning fixture 49 as seen in FIG. 8. Plate 59 has a plurality of transversely extending grooves 61 in its outwardly facing surface and a plurality of vertically arranged apertures 63, both shown in FIG. 9. Plate 59 interfaces with a plate 65 (FIGS. 8 and 11). Stud 73 mounts plate 65 to plate 59 by engaging aperture 75 in plate 65 and any one of the plurality of apertures 63 in plate 59. Plate 65 further mounts actuator 27 via bolts 67 engaging apertures 71 and an actuator housing 69. Thus, actuator 27 can be adjustably positioned at a plurality of vertical heights defined by stud 73 mating with one of selected apertures 63. Choosing the upper apertures increases the vertical range over which the clamps associated with the actuators may grip the sheet material 25. Choosing the lower apertures increases the stroke with which the actuator may pull the sheet material 25 downwardly. Preferably, stud 73 is a threaded stud which mates with threads in apertures 63 to retain plate 65 against plate 59.

Positioning fixture 49 has two means for angularly positioning actuators 27 and clamps 13b relatively to mold part 3. The first angular positioning means permits actuators 27 to be positioned at predetermined angles 77 in a plane extending lengthwise of the mold, parallel to the elongated members of frame 37, as seen in FIGS. 3 and 4. The first angular positioning means allows the direction of pull of actuators 27 to be adjusted to differentially stretch different regions of sheet material 25 parallel to the mold periphery. As shows in FIG. 4, actuators 27a and 27b will stretch sheet regions "B" and "C" downwardly toward the sloping surfaces 86. Being set at angle 77, the actuators also pull relatively away from region "A" toward regions "B" and "C" on sheet material 25 and will tend to stretch sheet region "A" more than "B" or "C" in the lateral direction, resulting in greater total stretching in region "A" than in regions "B" or "C". Adjusting angles 77 thereby allows infinite proportional control over the relative differential stretching of regions "A""B" and "C" by the actuators 27, allowing region "A" to be stretched more, or regions "B" or "C" to be stretched more, or all regions to be stretched the same.

Rotation of actuator 27 through angle 77 is effected by stud 73 acting as a pivot means and allowing plate 65 to rotate through angle 77 relatively to plate 59 in a plane parallel to both plates. Plate 65 can be locked into a desired angular position by one or more locating pins 79 each passing through one of a plurality of locating pin apertures 81 in plate 65 and each engaging one of the plurality of grooves 61 in plate 59. Locating pin 79 will bear against one of grooves 61 and will prevent further rotation of plate 65, thereby locking actuator 27 at a desired angular position 77.

The second angular positioning means allows actuator 27 to be positioned at an angle 83 in a plane perpendicular to the axis of the elongated support members of frame 37, as shown in FIG. 8b. The second angular adjustment means allows clamps 13b and actuators 27a and 27b to stretch sheet material 25 in a second direction, shown in FIG. 7 by arrows 91, perpendicular to the frame 37, simultaneously with stretching the sheet material parallel to the frame, effected by the first angular adjustment means as noted above. When oriented vertically, as shown in FIG. 8a, actuator 27 and clamp 13b do not stretch sheet material 25 perpendicularly to frame 37. However, when angled inwardly toward the mold through angle 83 as shown in FIG. 8b, the downward stroke of actuator 27 will tend to pull the sheet material 25 downwardly toward the mold and outwardly away from the mold centerline, perpendicular to frame 37, as shown by arrows 91 in FIGS. 7 and 8b. Sheet material 25 is stretched from its position shown in phantom at 25a by the angled actuators 27 and clamps 13b pulling outwardly as shown at 91 and downwardly, as shown at 89. Such outward stretching is useful to effect a thinning of sheet material 25 in regions of shallower draft as necessary to provide a relatively uniform material thickness over the sheet. Angular orientation 83 directly controls the degree of outward stretch and thereby controls the degree of thinning of sheet material 25. A greater angle 83 will provide proportionally greater stretching, whereas a vertical actuator orientation, corresponding to zero angular orientation, produces no outward stretching of sheet material 25 and no associated thinning.

The capability to stretch the sheet outwardly is also useful to effect the efficient utilization of raw material. The sheet material, as shown in FIG. 5 at 25 and in phantom in FIG. 7 at 25a can be cut smaller than mold part 3a and stretched outwardly to adequately cover the surface area of the mold.

To effect this angular adjusting means, elongated channel 51 is preferably given a circular section as shown at channel 51a in FIGS. 8a and 8b. The circular section allows channel 51a to rotate around frame 37 through angle 83 as shown, positioning actuator 27 at a desired angle perpendicular to the frame. Actuator 27 may be locked into any preferred angular position preferably by clamping means 85 which engages and compresses flanges 53, causing channel 51a to frictionally grip the frame 37 and prevent further rotation of actuator 27.

Figure 2:
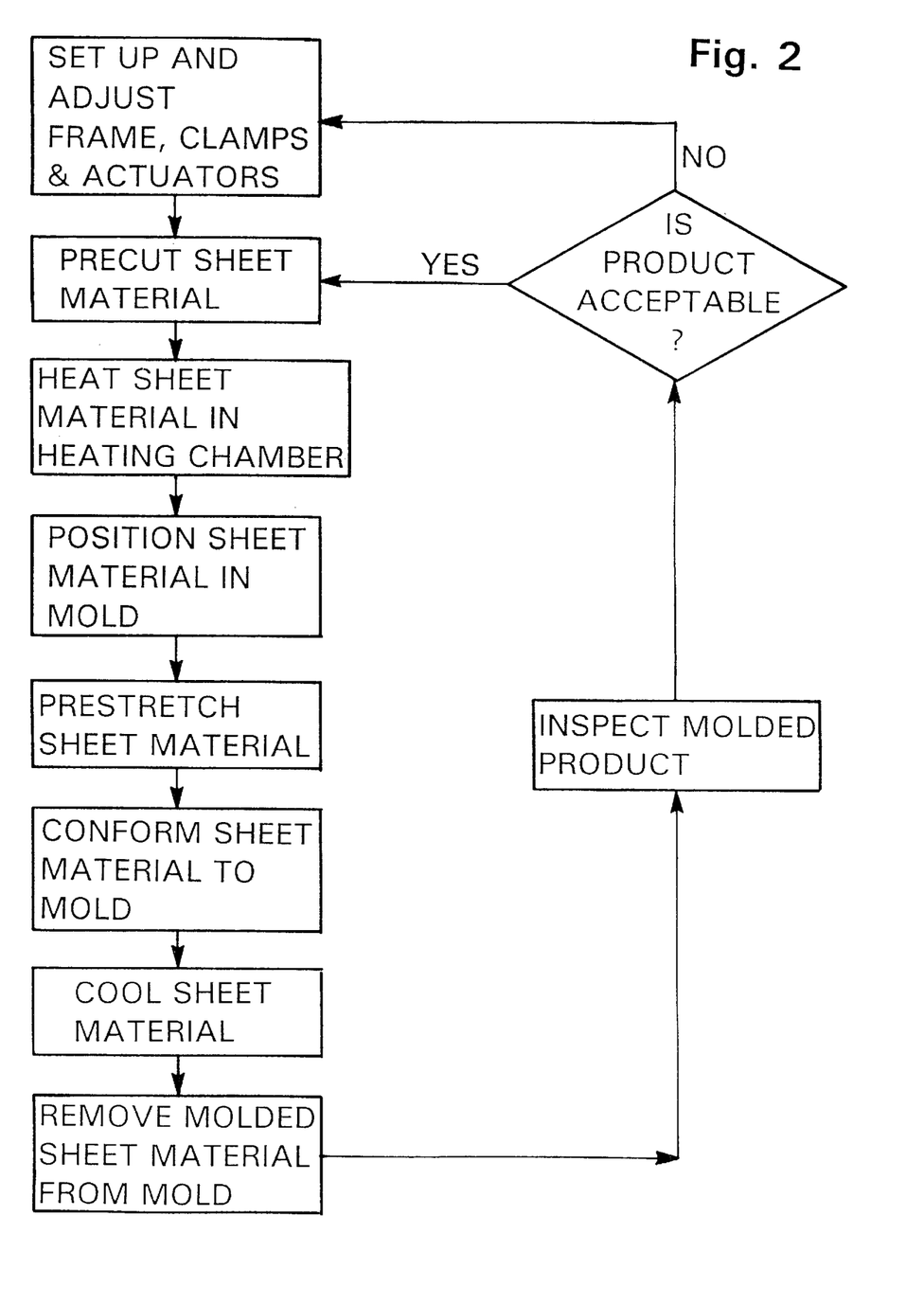
FIG. 2 shows a block diagram outlining the preferred steps of the method according to the invention.

A preferred embodiment of the method of the invention is shown in the flow chart of FIG. 2. The first step is setup and adjustment, wherein the actuators and clamps are selectively positioned on frame 37.

A number of clamps 13a and 13b and actuators 27 are selectively positioned around mold part 3, depending upon the draft and shape of the mold and the rheological properties of the sheet material 25. Positioning fixtures 49 and 49a mounting actuators 27 and clamps 13a are slid along frame 37 to position actuators 27 and clamps 13b adjacent to regions of greater draft, such as at 9 in FIG. 1 or 9a in FIGS. 6 and 7. As stated previously, deep draft regions have more surface area which needs to be covered by the sheet material 25. Therefore, actuators 27 are needed in regions of deep draft to pull sufficient material into the draft of the mold and ensure adequate coverage without excessive localized thinning of the sheet. Once positioned, actuators 27 are then rotated in a plane parallel to frame 37 via the first angular adjustment means described above to set the actuator angle 77, seen in FIGS. 3 and 4. Angle 77 determines how the sheet will be differentially stretched to provide sufficient material for mold coverage in the deep draft region. As can be deduced from FIG. 4, increasing angles 77 will draw more material into deep draft region 9a by stretching region "A" by a greater amount than region "B", while decreasing angles 77 will draw more material by stretching region "B". Material stretch is limited by the rheological properties of sheet 25, and it is most economical of material to stretch the sheet near to but below its strain to failure limit.

The second angular adjustment means is next preferably adjusted, rotating actuators 27 on frame 37 in a plane perpendicular to the frame through angle 83 as shown in FIG. 8b. As previously mentioned, actuator angle 83 controls the degree of stretch of sheet material 25 outwardly from the mold, effecting a thinning of the sheet. Angle 83 is set to provide relatively uniform thinning of the sheet material 25 for regions of shallow draft in comparison with regions of greater draft. Thus, proximate to regions such as 11 in FIG. 1, actuator 27 will be set to a relatively large angle 83 perpendicular to frame 37 in order to adequately thin the material to provide relative uniformity between regions of shallow draft, which have less surface area to cover and tend not to stretch the sheet as much as the deeper draft regions such as 9, which tend to stretch the sheet more due to the greater surface area. Again, the rheological characteristics of sheet material 25 place limits on the degree of stretch.

Actuator angle 83 is also set in conjunction with the precutting step of sheet material 25. The precutting step is important because significant material savings can be realized if the sheet is cut properly relatively to the mold and its draft. The method of molding according to the invention allows the sheet to be cut smaller than the mold, as seen at 25 in FIG. 5. This is unlike the traditional method wherein the sheet needs to be generally larger than the mold to ensure adequate coverage of the mold. The same rheological information is preferably used to precut the sheet material to a predetermined efficient size and shape to take full advantage of the molding method according to the invention.

Material typically used in automobile applications can withstand strains of 20% to 30% before tearing. Using this information in conjunction with mold draft, it is possible to estimate the degree of prestretch to apply at the various selected points on the periphery of the sheet material to effect the desired uniform thickness and achieve adequate mold coverage with less sheet material. The prestretch is proportional to the actuator angle 83, as seen above.

It is next preferable to position clamps 13a as needed on frame 37 to provide adequate support to the sheet material 25. Clamps 13a are positioned, as seen in FIGS. 1 and 4–7 to prevent unsupported sheet edges from falling into the mold and to provide the necessary equilibrium to the sheet when it is subjected to the tensioning forces of the actuators by providing reaction points against which the sheet can be pulled.

With all actuators and clamps initially positioned and locked in place by the various locking means described above, at least one trial run is made molding a product by the method of the invention.

Sheet material 25 is precut to the size as determined above by traditional methods such as shearing.

After precutting, the sheet material is preferably heated, as indicated in step 3 of FIG. 2. The sheet is passed through a heating chamber in which a suitable heat source, such as infrared heaters not shown are located. The sheet should be heated to a temperature above its glass transition temperature but below its melting point.

Sheet 25 is next positioned and clamped over mold part 3a, as depicted in FIGS. 4 and 5. Actuators 27 extend clamps 13b with jaws 15 open to grasp sheet 25 at a plurality of preselected points on the sheet periphery. Jaws 15 of clamps 13a and 13b close, holding sheet 25 against anvils 23. The actuators next retract, differentially prestretching sheet 25 at preselected locations on the sheet, drawing the sheet downwardly into regions of greater draft, as depicted schematically at 9a in FIGS. 6 and 7. Sheet 25 is thus moved to different preforming heights independently of the mold geometry. Retracting actuators 27 also prestretch sheet 25 in regions of lesser draft, as shown schematically at 11a, effecting a thinning of the sheet material avoiding undesired elongation variability of the sheet material between sheet portions overlying regions of greater draft and sheet portions overlying regions of lesser draft. Due to the first and second angular positioning means of the actuators 27 as described above, the actuators simultaneously differentially prestretch sheet 25 in two directions, downwardly into the draft of the mold parallel to frame 37 as at 89 and outwardly away from the mold perpendicular to frame 37, as seen at 91. It is preferable that most of the material stretching occurs during this prestretching step.

In the next step, the sheet is made to conform to the mold shape.

The sheet is allowed to cool in the mold to a temperature below its glass transition point. Mold 1 is then opened, disengaging the mating mold parts 3 and 5 and the sheet, now a molded product, is removed from the mold.

The finished product from the trial run is inspected for characteristics such as wrinkles, adequate thickness in regions of deep contours and excessive as well as uniformity of thickness in other regions, these characteristics providing a gage of product quality. Preferably, a grid work 93 of lines, shown in FIG. 5, is drawn on the trial sheet material prior to the heating step to aid in the inspection step. The grid work distorts in proportion to the differential stretching throughout the various regions of the sheet material. The grid work, preferably squares 100 mm by 100 mm, can thus be used to directly observe and measure the differential stretching of the sheet material at any location on the sheet, preferably especially the region of deep draft. Measurement of the deformed grids will allow repositioning of the clamps and actuators to stretch the sheet material close to its strain limit uniformly over the entire sheet, avoiding both concentrated localized stretching and excessive material thickness. For example, if measurements of grids in region "A" show a strain greater than 20%–30% in a direction parallel to frame 37, it may be desirable to adjust the angle 77 of actuators 27a to a smaller angle such that region "A" will be stretched less, below the strain limit. Similarly, it might be seen, from measurements of the grid in region "B" that too much distortion is occurring in the deep draft region 9a of the mold. This would indicate insufficient material draw into the region to cover the larger surface area. Therefore, it would be desirable to unlock and slide actuators 27a on frame 37 more toward region "A" such that clamps 13b might grip sheet material 25 nearer its center and pull proportionally more material into deep draft region 9a. It may further be discovered on measurement of the grids in region "A" that insufficient strain is being developed in a direction perpendicular to the frame, indicating inefficient material usage due to excessive material thickness. It would then be necessary to increase the angle 83 associated with the second angular adjustment means of actuators 27 to increase the degree of pull in the perpendicular direction 91 to further stretch the sheet to its strain limit. Alternately, the sheet material 25 could be precut smaller while keeping the stroke and angle of the actuators constant, thus using less material and realizing a further savings. The range of the actuator could be adjusted by the vertical positioning adjustment, shifting plate 65 relatively to plate 59 and having stud 73 engage a higher aperture 63 on plate 59 as necessary to allow clamp 13b to adequately grip sheet material 25. Finally, if wrinkles are seen to develop in the product, it may be necessary to relocate clamps 13a by adjusting the location of positioning fixture 49 on frame 37 to provide reaction points more directly aligned with the tension forces induced by the actuators and the conforming step of the mold, thereby counteracting diagonal shearing forces which tend to cause wrinkling of the sheet.

The inspection step is necessary to adjust the apparatus for optimized production which will provide for reasonable uniformity of product thickness and efficient use of raw material, reducing waste and rejected product due to excess thinning, tearing, or permanent wrinkling of the sheet material 25 during the molding process. Once the optimum positions of the clamping and tensioning means have been established as noted above, the method and apparatus according to the invention can be used to mass produce the molded product.

A preferred method of molding sheet material according to the invention thus comprises the steps of precutting the sheet material to a predetermined shape and size predimensioned to the mold shape and draft, heating the sheet material to a temperature above the glass transition temperature but below the melting point of the material, clamping the heated sheet on the mold, prestretching the sheet via clamps and actuators thereby moving the sheet to different forming heights, conforming the sheet to the mold, cooling the sheet and removing the molded sheet material for further processing such as trimming before final installation, for example, in an automobile. The preferred method also includes performing trial runs as described above, to optimize actuator and clamp placement before mass production runs ensue.

The prestretching step of the method according to the invention provides a major departure point between the method of the invention and traditional methods of compression molding of thermoplastic sheet material. In the traditional method, the sheet is not prestretched before mold engagement and the mold itself differentially stretches the sheet material when mold parts interengage. By contrast, in the method of the invention most of the sheet stretching preferably occurs when the tensioning means prestretches the sheet prior to mold part engagement. Prestretching of the sheet provides several advantages over the traditional method. Prestretching by the method of the invention allows pinpoint control of sheet stretching, thus avoiding unacceptable thinning of sheet material due to excessive concentrated localized stretching in deep draft regions. Prestretching the sheet material into the deep draft regions ensures that sufficient material is available to cover the greater surface area of such regions with adequate material thickness. In the traditional method the mold itself draws the material into the deep draft, and there is no way to reliably ensure that sufficient material is drawn to cover the relatively larger surface area. Traditional methods address this problem by draping the sheet in the draft before mold engagement, but this practice is wasteful of material and can cause permanent wrinkles to form if sufficient tension is not maintained on the sheet, resulting in a high rejection rate for the finished product.

The traditional method is also wasteful of material in the regions of shallow mold draft. The mold does not stretch the material as much in the region of shallow draft with the result that the final product is thicker than it need be in this region. The method of the invention by contrast provides for significant prestretching of the sheet material in the shallow draft region of the mold to thin the material. Material thinning is matched to the rheology of the material and the thickness of the material in the deep draft region. Thus, the precut material blank can be sized smaller by the method of the invention than needed for the traditional method, the material being prestretched to adequately cover the mold and provide a relatively uniform thickness of the finished product throughout regions of deep and shallow draft.

The method of compression molding according to the invention is also more efficient than traditional methods with regard to tooling cost and tooling set up time. In traditional methods, the tentering system is usually an integral part of the mold, permanently attached to the mold and custom designed to the particular shape and draft of the mold. This integral design complicates the mold manufacture, taking longer to produce and making the mold more expensive. Moreover, the tentering system must be designed using intuition without the benefit of trial runs indicating how the mold will draw the sheet material. It is difficult to intuitively achieve optimum mold performance with regard to raw material saving without some later adjustment. Adjusting the tentering system after the integral mold has been completed is expensive and time consuming, resulting in few molds being adjusted and actually achieving peak performance for both product quality and raw material economy. Furthermore, once a production run is completed, the tentering system, along with the mold, is scrapped, returning only its salvage value.

I claim:

1. Apparatus for compression molding of sheet material into a molded product, comprising:

a mold having a draft and comprising interengagable mold parts, the draft of said mold being greater at a first predetermined location than at a second predetermined location, said mold parts being relatively movable between an open, disengaged position and a closed, interengaged position;

means for positioning said sheet material between said mold parts when said mold parts are in said open position;

first sheet tensioning means operatively connected to said positioning means for selectively differentially prestretching and drawing said sheet material from said second predetermined location into said first predetermined location prior to interengagement of said mold parts;

a frame surrounding said mold, said frame including elongated support members extending along the mold perimeter, and means mounting said sheet tensioning means at preselected locations on said elongated support members;

said sheet tensioning means comprising a plurality of devices for pretensioning said sheet material at preselected locations around the perimeter of said sheet material;

said means mounting each of said pretensioning devices comprising a positioning fixture slidably supported on said elongated support members, said positioning fixture having second means for locking said positioning fixture at preselected locations on said support member;

said means mounting each of said pretensioning devices further comprising an upright holding fixture, said upright holding fixture including an elongated channel section having a pair of spaced flanges and an open side, said channel section fitting over and slidably engaging said elongated support members, said channel section having said second locking means for fixing said channel section at preselected locations on said elongated support members, said upright holding fixture having means for vertically positioning said pretensioning device comprising:

a first plate fixed to said upright holding fixture, said first plate having a plurality of apertures vertically spaced at a plurality of predetermined heights; and a second plate fixed to said pretensioning device, said second plate having a stud projecting perpendicularly from the surface thereof for selectively mating with one of said vertically spaced apertures in said first plate, said plates overlapping when said stud mates with said one aperture of said vertically spaced apertures.

2. Apparatus according to claim 1 further having second sheet tensioning means for prestretching said sheet material at said second location prior to said mold interengagement, and regulating means controlling said first and second sheet tensioning means for maintaining a substantial uniformity of thickness in the molded product at said first and second locations.

3. Apparatus according to claim 1 wherein said sheet tensioning means comprises a sheet tensioning device for simultaneously prestretching said sheet material in two different directions at said first location, said sheet tensioning device being angularly oriented to draw said sheet material downwardly to and outwardly from one of said mold parts into said first location prior to said mold interengagement.

4. Apparatus according to claim 1 wherein said positioning means comprises:

clamping means for gripping said sheet material at predetermined locations around the periphery of said sheet material when said sheet material is positioned between said disengaged mold parts; and wherein said sheet tensioning means comprises actuating means attached to said clamping means for applying tensioning forces to said sheet material.

5. Apparatus according to claim 4 further including regulating means for said sheet tensioning means, said regulating means regulating the difference in stretching at said predetermined locations.

6. Apparatus according to claim 1 having means for precutting said sheet material to a predetermined size relatively to said prestretching, said size being inversely proportional to said prestretching.

7. Apparatus according to claim 1 further having heating means for preheating said sheet material to a temperature above its glass transition temperature, said preheating means heating said sheet material prior to said positioning means positioning said sheet material between said mold parts.

8. Apparatus according to claim 1 in which said frame is rectangular in shape.

9. Apparatus according to claim 1 in which said elongated support members are interfitting and further comprising first adjustment means permitting relative movement of said interfitting members to effect a change in size of said frame.

10. Apparatus according to claim 1 in which said elongated support members comprise tubular beams and tubular fittings, said fittings having means for attachment to said mold, said beams interfitting within said fittings and interconnecting said fittings to form said frame, said beams telescoping coaxially within said fittings to effect a change in size of said frame, said fittings further having first means for locking said beams coaxially within said fittings.

11. Apparatus according to claim 10 in which said first locking means comprises:

a plurality of equidistantly spaced apertures in said fittings and said beams, said apertures arranged lengthwise along said beams and said fittings and being movable into positions in which selected beam apertures and the fitting apertures are in registration; and pin members mating with selected ones of said apertures in registration, thereby locking said beam and said fitting in selected coaxial positions.

12. Apparatus according to claim 11 wherein said second locking means comprises said flanges having at least two apertures spaced lengthwise along said flanges aligning with said elongated support member having at least two apertures spaced lengthwise along said elongated support member at said preselected locations on said frame;

a locking pin mating with said apertures in said flange and said elongated support member when said apertures are aligned, said locking pin preventing sliding motion of said channel, thereby locking said upright holding fixture at one of said preselected locations on said frame.

13. Apparatus according to claim 1 in which said upright holding fixture has a first means for angularly positioning said pretensioning device comprising:

said first plate having a plurality of grooves in a first surface of said first plate facing outwardly from said frame;

said second plate having said stud engaging said first plate for pivoting motion of said second plate in a plane parallel to the surfaces of said overlapping plates, said second plate further having at least one locating pin projecting from the surface of said second plate, said locating pin engaging one of said grooves in said first plate, preventing said pivoting motion and thereby angularly positioning said pretensioning device attached to said second plate.

14. Apparatus according to claim 13 in which said vertical support has a second means for angularly positioning said pretensioning device comprising;

said elongated channel section having a circular cross section fitting over and rotatably engaging said elongated support member, said vertical support rotating about said elongated support member perpendicularly to said frame, thereby angularly positioning said tensioning means;

clamping means engaging said channel section causing said channel to frictionally grip said elongated support member thereby fixing said tensioning means at a predetermined angular position perpendicularly to said frame.

* * * * *

UNITED STATES PATENT AND TRADEMARK OFFICE
CERTIFICATE OF CORRECTION

PATENT NO. : 5,843,492
DATED : December 1, 1998
INVENTOR(S) : McCorry

It is certified that error appears in the above-identified patent and that said Letters Patent is hereby corrected as shown below:

Column 16, line 13, change "claim 11" to --claim 1--

Signed and Sealed this

Thirtieth Day of March, 1999

Attest:

Q. TODD DICKINSON

*Attesting Officer*   *Acting Commissioner of Patents and Trademarks*